United States Patent
Dettinger et al.

(10) Patent No.: US 8,326,848 B2
(45) Date of Patent: Dec. 4, 2012

(54) PROACTIVE ANALYTIC DATA SET REDUCTION VIA PARAMETER CONDITION INJECTION

(75) Inventors: Richard Dean Dettinger, Rochester, MN (US); Frederick Allyn Kulack, Rochester, MN (US); Amanda E. Peters, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/538,980

(22) Filed: Aug. 11, 2009

(65) Prior Publication Data

US 2011/0040775 A1    Feb. 17, 2011

(51) Int. Cl.
*G06F 17/30* (2006.01)
*G06F 7/00* (2006.01)
(52) U.S. Cl. .......................... 707/755; 707/722
(58) Field of Classification Search .................. 707/755, 707/722
See application file for complete search history.

(56) References Cited

U.S. PATENT DOCUMENTS

| | | | |
|---|---|---|---|
| 2003/0212691 A1* | 11/2003 | Kuntala et al. | 707/100 |
| 2005/0283318 A1* | 12/2005 | Ostoich et al. | 702/19 |
| 2008/0250051 A1* | 10/2008 | Grechanik et al. | 707/102 |
| 2009/0254971 A1* | 10/2009 | Herz et al. | 726/1 |

* cited by examiner

*Primary Examiner* — Kuen Lu
(74) *Attorney, Agent, or Firm* — Patterson & Sheridan LLP (57) ABSTRACT

Systems, methods and articles of manufacture are disclosed for injecting parameter conditions to reduce a size of a data set to be processed. A data set may be received to be processed by an analytic routine. The data set may include results from executing a first query. Further, input may be received from a user, the input specifying a parameter specific to the analytic routine to be performed on the data set. At least one condition associated with the specified parameter may be identified. A second query may be generated from the first query and the identified condition. The second query may be executed to generate a reduced data set. The analytic routine may be performed on the reduced data set to generate an output to the user.

22 Claims, 7 Drawing Sheets

PROACTIVE ANALYTIC DATA SET REDUCTION VIA PARAMETER CONDITION INJECTION

BACKGROUND OF THE INVENTION

1. Field of the Invention

Embodiments of the invention relate to data processing. More specifically, embodiments of the invention relate to injecting parameter conditions to reduce a size of a data set to be processed.

2. Description of the Related Art

Databases are well known systems for information storage and retrieval. The most prevalent type of database in use today is the relational database, a tabular database in which data is defined so that it can be reorganized and accessed in a number of different ways. A relational database management system (DBMS) uses relational techniques for storing and retrieving data.

A database schema is used to describe the structure of a database. For example, a relational schema describes the set of tables, columns, and primary and foreign keys defining relationships between different tables in a relational database. Applications are developed that query data according to the relational schema. For example, relational databases are commonly accessed using a front-end application configured to perform data access routines, including searching, sorting, and query composition routines. At the back-end, software programs control data storage and respond to queries submitted by to predict a strength of association or binding affinity between two users interacting with the front-end.

Structured Query Language (SQL) is a widely used database language that provides a means for data manipulation, and includes commands to retrieve, store, update and delete data. An SQL query is constructed according to the relational schema for a given relational database, and according to the explicitly defined SQL grammar. An SQL query comprises a text string that must strictly conform to the grammar requirements of the SQL language and must also be semantically correct to perform as desired by the user.

An important aspect of medical research involves analytic processes run over large amounts of data. Often, such large amounts of data may require large amounts of time to be evaluated, especially when the analytic process involved is complex. An example of such an analytic process is a molecular docking routine performed on a set of chemical structures. Molecular docking (or simply docking) predicts the preferred orientation of a first molecule to a second molecule, when the first and second molecules are bound to each other to form a stable complex. Knowledge of the preferred orientation may then be used to predict a strength of association or binding affinity between the two molecules.

SUMMARY OF THE INVENTION

One embodiment of the invention includes a method for reducing a size of a data set to be processed by an analytic routine, the method comprising configuring one or more computer processors to perform an operation. The operation itself may generally include receiving a data set to be processed by the analytic routine. The data set includes a set of data records returned from executing a first query. The operation may also include receiving, from a user, one or more parameters to pass with the data set to the to the analytic routine, identifying, from the one or more parameters, one or more conditions having predefined relationships to the respective parameters, and evaluating each data record of the data set based on the one or more parameters and the one or more conditions to identify a reduced data set containing less than all of the set of data records. The operation may further include performing the analytic routine on the reduced data set to generate a result set and outputting the result set.

Another embodiment of the invention includes a computer readable storage medium containing a program which, when executed, performs an operation for reducing a size of a data set to be processed by an analytic routine. The operation itself may generally include receiving a data set to be processed by the analytic routine. The data set includes a set of data records returned from executing a first query. The operation may also include receiving, from a user, one or more parameters to pass with the data set to the to the analytic routine, identifying, from the one or more parameters, one or more conditions having predefined relationships to the respective parameters, and evaluating each data record of the data set based on the one or more parameters and the one or more conditions to identify a reduced data set containing less than all of the set of data records. The operation may further include performing the analytic routine on the reduced data set to generate a result set and outputting the result set.

Still another embodiment of the invention includes a system having a processor and a memory containing a program, which when executed by the processor is configured to perform an operation for reducing a size of a data set to be processed by an analytic routine. The operation itself may generally include receiving a data set to be processed by the analytic routine. The data set includes a set of data records returned from executing a first query. The operation may also include receiving, from a user, one or more parameters to pass with the data set to the to the analytic routine, identifying, from the one or more parameters, one or more conditions having predefined relationships to the respective parameters, and evaluating each data record of the data set based on the one or more parameters and the one or more conditions to identify a reduced data set containing less than all of the set of data records. The operation may further include performing the analytic routine on the reduced data set to generate a result set and outputting the result set.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally inject parameter conditions to reduce a size of a data set to be processed according to an analytic process. An example of such an analytic process is a molecular docking routine performed on a set of chemical structures. While embodiments are described herein with respect to a molecular docking routine, those skilled in the art will recognize that embodiments of the invention may be adapted to support other analytic processes. For example, analytic processes related to medical or chemical research and that is run over large data sets.

Further, one embodiment of the invention provides a data abstraction model. A database abstraction model provides an abstract view of a physical data storage mechanism. A requesting entity (i.e., an end-user or front-end application) may be provided with an abstract representation of data stored in an underlying physical storage mechanism, such as a relational database. In this way, the requesting entity is decoupled from the underlying physical data when accessing the underlying DBMS. Abstract queries based on the framework can be constructed without regard for the makeup of the underlying database. Further, changes to the schema for the database do not also require a corresponding change in the query application front-end; rather, the abstraction provided by the framework can be modified to reflect the changes.

One embodiment of a data abstraction model defines a set of logical fields, corresponding to a users' substantive view of data, which are loosely coupled to the underlying physical databases storing the data. The logical fields are available for a user to compose queries that search, retrieve, add, and modify data stored in the underlying database. The abstract query may be used to generate an SQL query statement processed by a relational DBMS.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein use discrete modules or components interacting with one another. Those skilled in the art recognize, however, that different embodiments may combine or merge such components and modules in many different ways.

Physical View of the Environment

Figure 1:
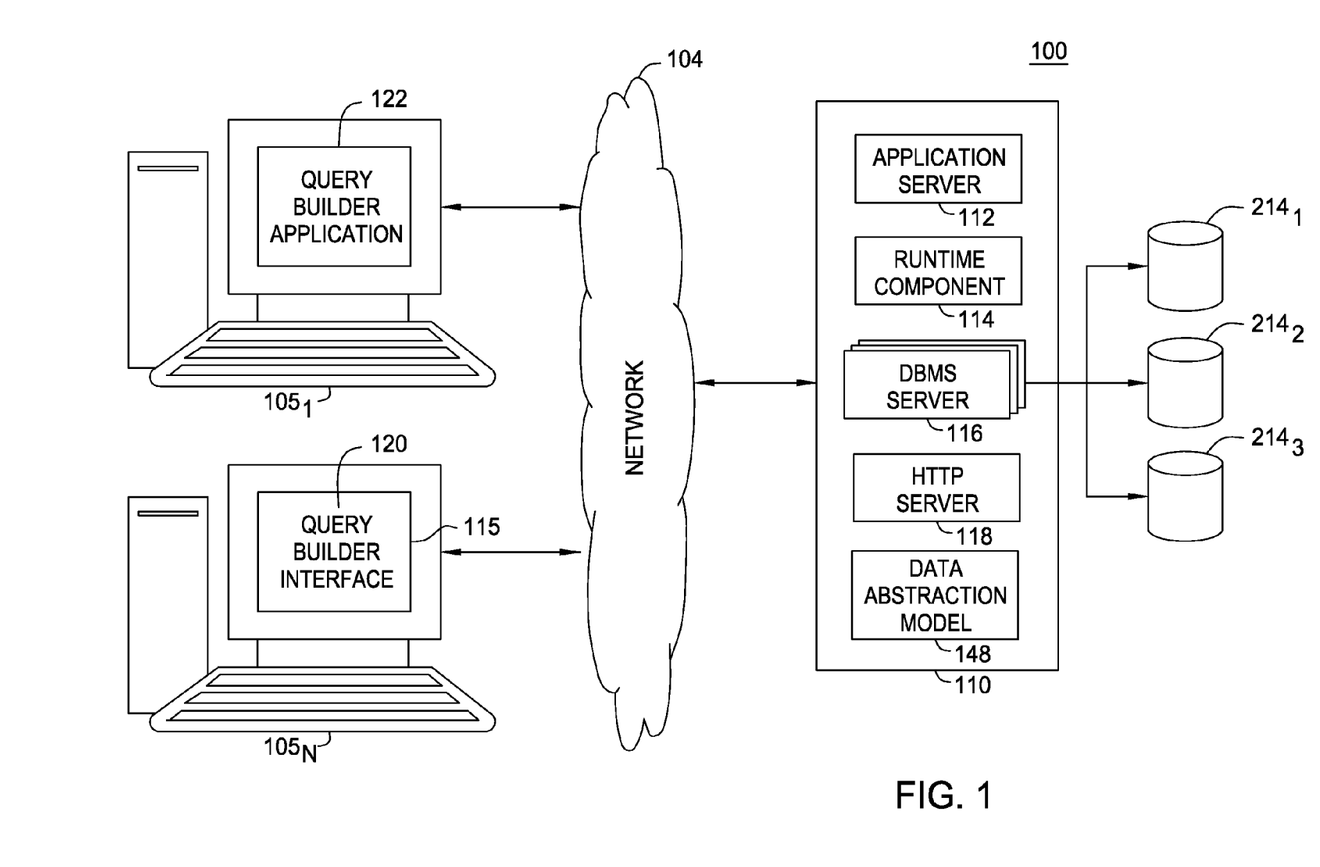
FIG. 1 illustrates a relational view of software and hardware components, according to one embodiment of the invention.

FIG. 1 illustrates a networked computer system 100 in a client-server configuration. Client computer systems $105_{1-N}$ include a network interface allowing them to communicate with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 may execute an operating system, (e.g., a Linux® distribution, Microsoft Windows®, IBM's AIX®, FreeBSD, and the like) that manages the interaction between hardware components and higher-level software applications running on client system 105.

The client system 105 may also include a network interface device (not shown). The network interface device may be any type of network communications device allowing the client system 105 to communicate with other computer systems via the network 104. Further, the client system 105 may include an input device (not shown) and an output device (not shown).

The input device may be any device for providing input to the client system 105. For example, a keyboard, keypad, light pen, touch-screen, track-ball, or speech recognition unit, audio/video player, and the like may be used. The output device may be any device for providing output to a user of the client system 105. For example, the output device may be any conventional display screen or set of speakers, along with their respective interface cards, i.e., video cards and sound cards (not shown). Further, the output device and input device may be combined. For example, a display screen with an integrated touch-screen, a display with an integrated keyboard, or a speech recognition unit combined with a text speech converter may be used.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated.

The server system 110 may include hardware components similar to those used by client system 105. Accordingly, the server system 110 generally includes a CPU, a memory, and a storage device, coupled to one another by a bus (not shown). The server system 110 may also execute an operating system, (e.g., a Linux® distribution, Microsoft Windows®, IBM's OS/400® or AIX®, FreeBSD, and the like) that manages the interaction between hardware components and higher-level software applications.

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network that acts as a single system, single-user workstations, or network appliances lacking non-volatile storage of their own. Additionally, although described herein using a client/server configuration, embodiments employing distributed computing, grid computing, and peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) adapted to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105.

Alternatively, or in addition, client application 120 may comprise a database front-end, or query application program running on client system $105_N$. The application 120 may allow a user to compose an abstract query and to submit the abstract query for processing to the runtime component 114. The application 120 may include a query-building interface 115. Application 120 and query building interface 115 allow a user to compose an abstract query according to a data abstraction model 148 that describes the abstraction created over databases 214.

As illustrated in FIG. 1, server system 110 may further include runtime component 114, DBMS server 116, and data abstraction model 148. Each of these components may comprise a software program executing on the server system 110. The DBMS server 116 (or servers) generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116. Further, databases 214 may exist on the local storage system of server system 110, or may be accessed over network 104. Thus, the data abstraction created by data abstraction model 148 may be constructed over both local and federated database configurations, and combinations thereof.

In one embodiment, a user composes an abstract query using logical fields defined by a data abstraction model 148. The data abstraction model 148 defines the relationship between each logical field and data from an underlying physical database mechanism. In one embodiment, each logical field defined by the data abstraction model 148 identifies a name and an access method. The access method identifies the underlying database (e.g., databases $214_{1-3}$) where the data is located, as well as the method of access used to access the data in the underlying physical storage mechanism. Embodiments of the data abstraction model, logical fields, and access methods are described in greater detail below.

Runtime component 114 is configured to generate a query consistent with the physical representation of the data contained in one or more of the databases 214. In other words, the runtime component is the "transformational engine" used to generate the physical query (e.g., an SQL statement) from an abstract query. The runtime component 114 takes an abstract query composed by a user, identifies the information corresponding to each logical field included in the query from the data abstraction model 148, and generates a physical query run by DBMS 116 against the underlying physical storage mechanism. In one embodiment, the runtime component 114 takes an abstract query and generates an abstract query plan corresponding to a given query, and then uses the abstract query plan to generate a resolved query. Additionally, the runtime component 114 may be configured to return query results to the requesting entity.

Figure 2A:
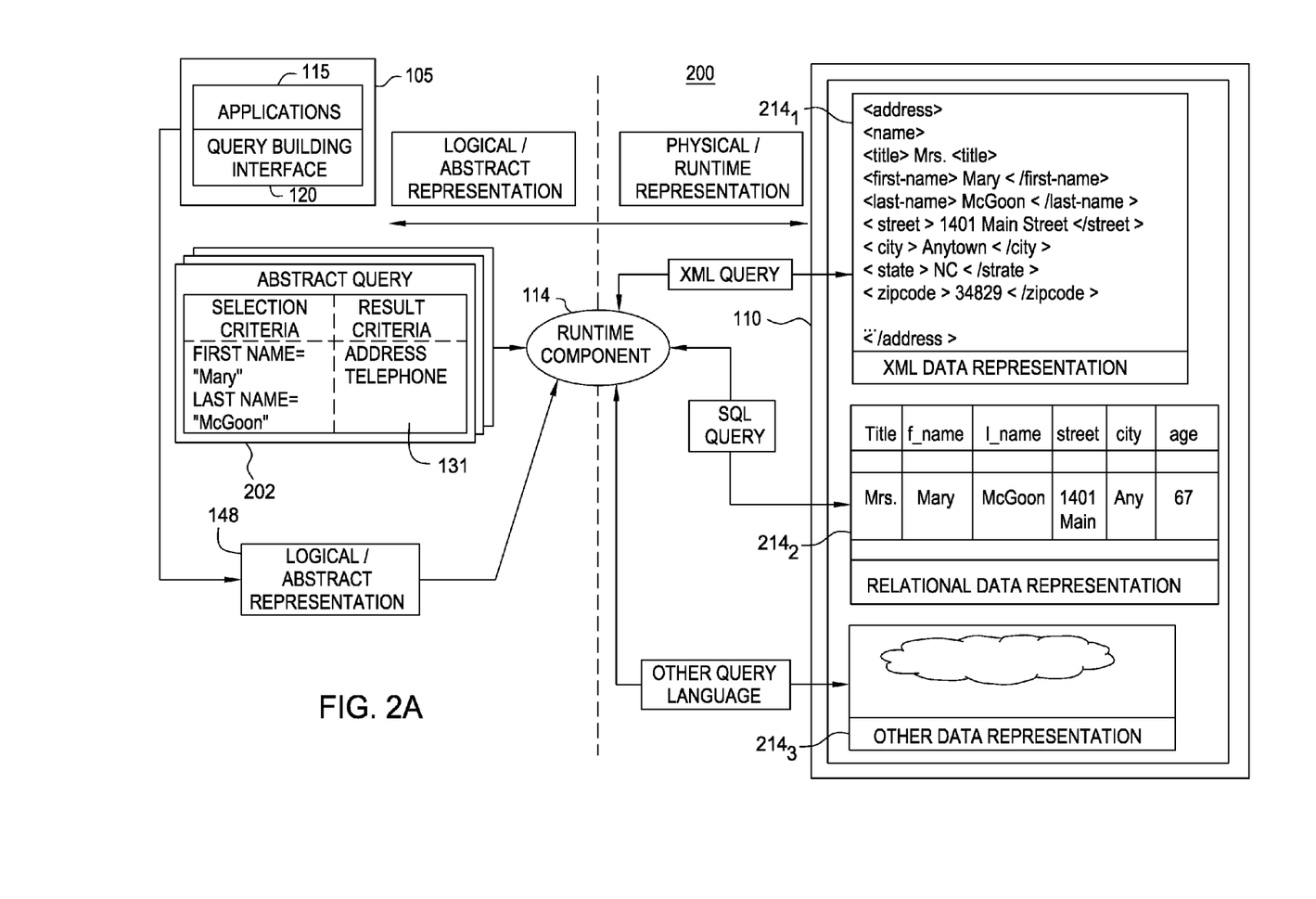
FIG. 2A illustrates a relational view of software components, according to one embodiment of the invention.

FIG. 2A illustrates a plurality of interrelated components of the invention, along with the transformation between the abstract view provided by the data abstraction model (the left side of FIG. 2A), and the underlying database mechanism used to store data (the right side of FIG. 2A).

In one embodiment, a requesting entity (e.g., a user interacting with application 115 executing on client system 105) composes an abstract query 202 using query building interface 120. The query building interface may be provided by the application 115, or may be a web-page rendered on web browser 122. The resulting query is generally referred to herein as an "abstract query" because it is composed from logical fields rather than by direct references to data entities in underlying databases $214_{1-3}$. As a result, abstract queries may be composed independently from the particular underlying relational database schema.

In one embodiment, the logical fields used to compose the abstract query 202 are defined by the data abstraction model 148. In general, the data abstraction model 148 exposes information as a set of logical fields that may be used within an abstract query to specify criteria 131 for data selection, and specify the form of result data returned from a query operation. The runtime component 114 is the bridge between the abstract representation provided by the data abstraction model 148, and the underlying physical database. For example, the runtime component 114 may transform abstract query 202 into an XML query that queries data from database $214_1$, an SQL query of relational database $214_2$, or other query composed according to another physical storage mechanism (whether currently known or later developed).

Logical View of the Environment

Figure 2B:
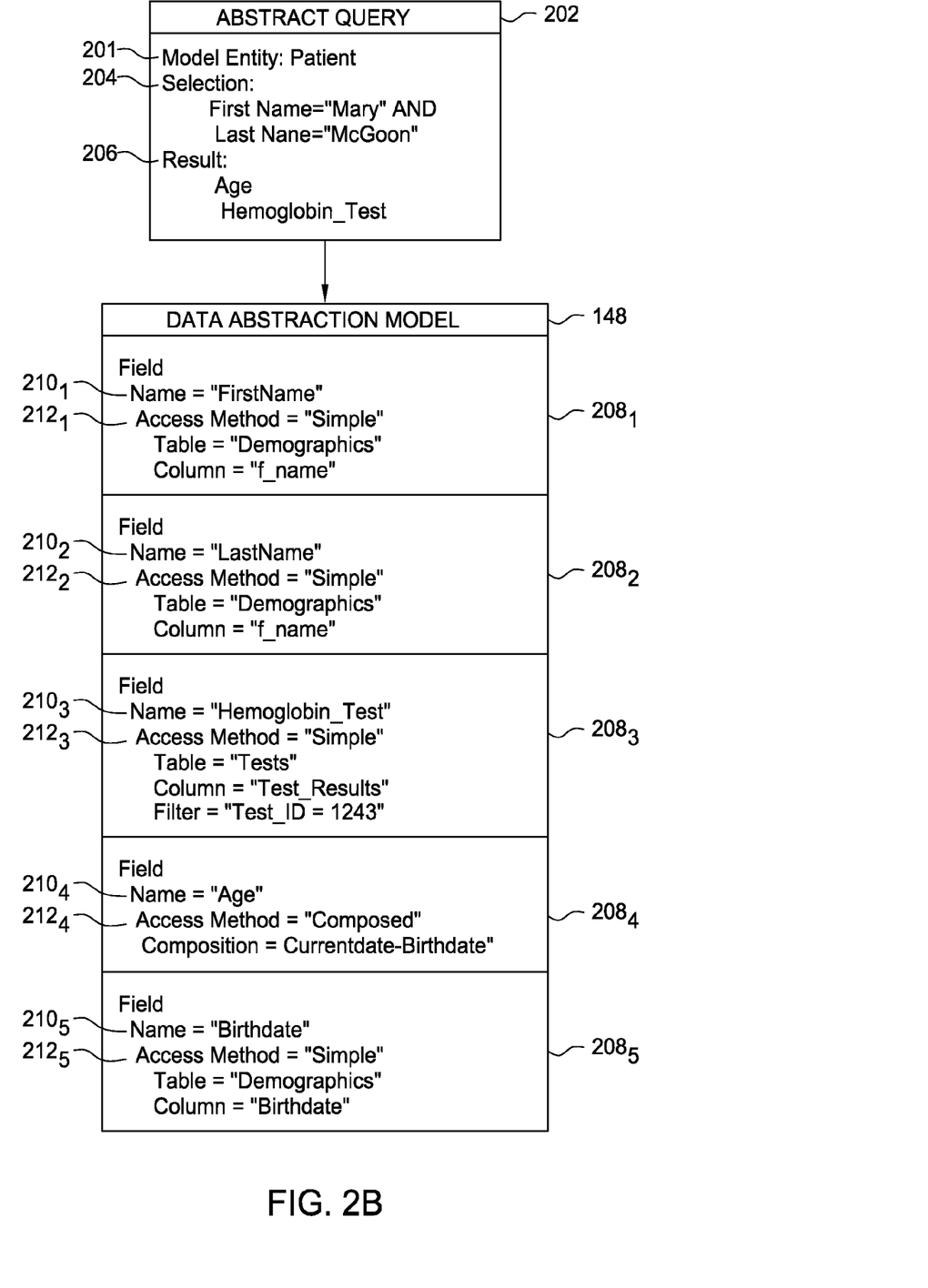
FIG. 2B illustrates an abstract query and corresponding data repository abstraction component, according to one embodiment of the invention.

FIG. 2B illustrates an exemplary abstract query 202. The query includes selection criteria 204 designed to retrieve information about a patient named "Mary McGoon." The particular information to be retrieved is specified by result criteria 206. In this case, the query retrieves an age and test results for a hemoglobin test. The actual data retrieved may include data from multiple tests. That is, the query results may exhibit a one-to-many relationship between the named patient and the test results for the patient.

In addition, abstract query 202 specifies a model entity 201, as illustrated, a "patient" model entity. Generally, model entities provide an additional layer of abstraction representing a composite of individual logical fields. Model entities provide end users and applications a higher level conceptual view that can simplify data query and modification tasks (i.e., insert, search and deletion). In addition, model entities provide the runtime component 114 with the focus or perspective for a particular abstract query. In other words, the model entity serves to identify broad categories of data, such as a "patient" data. As an example, the "patient" model entity from abstract query 202 maps to a group of fields in the database abstraction model all related to the "patient" model entity and to underlying data sources containing patient-related data.

In one embodiment, a user specifies the model entity is being queried as part of the query building process. Which model entities are available is defined by the framework provided by the data abstraction model 148. As described below, the runtime component 114 may use the model entity selected for an abstract to select a root node when constructing an abstract query plan. Model entities may be defined by additional metadata included in the data abstraction model 148. Detailed examples of Model entities are described in further detail in a commonly owned, pending application entitled "Dealing with Composite Data through Data Model Entities," application Ser. No. 10/403,356 filed on Mar. 31, 2003 and incorporated by reference herein in its entirety.

FIG. 2B further illustrates one embodiment of a data abstraction model 148 that comprises a plurality of logical field specifications $208_{1-5}$ (five shown by way of example). Collectively, logical field specifications 208 create an abstraction over a particular set of underlying physical databases and corresponding database schema. Those skilled in the art will recognize that multiple data repository abstraction models may be constructed over the same set of underlying physical storage mechanisms. Accordingly, abstractions may be constructed to expose different portions of data to different users, or abstractions constructed over the same data may differ, and may be customized to the needs of a particular user (or group of users).

The logical fields shown in FIG. 2B illustrate an abstraction constructed over a relational database. That is, the access methods included in field specifications 208 define a mapping between the logical field and tables and columns from a relational database (e.g., database $214_2$ from FIG. 2A). The data abstraction model 148 provides a logical field specification 208 for each logical field available for composition of an abstract query (e.g., abstract query 202). The logical field specification 208 stores a definition for each logical field, and any associated metadata. As illustrated, each field specification 208 identifies a logical field name $210_{1-5}$ and an associated access method $212_{1-5}$. The runtime component 114 uses the access method to map a logical field to a particular physical data storage mechanism 214. Depending upon the number of different types of logical fields, any number of access methods is contemplated. As illustrated in FIG. 2B, access methods for simple fields, filtered fields, and composed fields are provided.

Field specifications $208_1$, $208_2$ and $208_5$ each provide a simple access method $212_1$, $212_2$, and $212_5$. The simple access method provides a direct mapping to a particular entity in the underlying physical data representation. When this is a relational database, the simple access method maps the logical field to an identified database table and column. For example, the simple field access method $212_1$ shown in FIG. 2B maps the logical field name $210_1$ ("FirstName") to a column named "f_name" in a table named "Demographics." The logical field specification 208 may also include metadata indicating how the logical field is related to other entities in the data abstraction model 148.

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and the filter for each different test is used to identify when a particular test is associated with a logical field. An example is provided in FIG. 2B in which the access method for filtered field $212_3$ maps the logical field name $210_3$ ("Hemoglobin Test") to a physical entity in a column named "Test_Result" in a table named "Tests" and defines a filter "Test_ID='1243.' Accordingly, the filtered field acts as selection criteria used to restrict items from a larger set of data, without the user having to know the specifics of how the data is represented in the underlying physical storage mechanisms or to specify the selection criteria as part of the query building process.

Field specification $208_4$ exemplifies a composed access method $212_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method $212_3$ maps the logical field "Age" to another logical field $208_5$ named "birth date." The logical field "birthdate" $210_5$ maps to a column in the demographics table. The composition expression is used to compute a value for the composed field. In this example, an age value is computed by subtracting the current date from the birth date value returned by the "birth date" logical field.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A).

An illustrative abstract query corresponding to abstract query 202 is shown in Table I below. In this example, the abstract query 202 is represented using XML. In one embodiment, application 115 may be configured to generate an XML document to represent an abstract query composed by a user interacting with the query building interface 120 or web browser 122. Those skilled in the art will recognize that XML is a well known language used to facilitate the sharing of structured text and information, other languages, however, may be used.

TABLE I

QUERY EXAMPLE

001 <?xml version="1.0"?>
002 <!--Query string representation: (FirstName = "Mary" AND
003 LastName = "McGoon") OR State = "NC"-->
004 <QueryAbstraction>
005   <Selection>
006     <Condition internalID="4">
007       <Condition field="FirstName" operator="EQ" value="Mary"
008 internalID="1"/>
009       <Condition field="LastName" operator="EQ"
010 value="McGoon" internalID="3"
      relOperator="AND"></Condition>
011     </Condition>
012   </Selection>
013   <Results>
014     <Field name="Age"/>
015     <Field name="Hemoglobin_test"/>
016   </Results>
017   <Entity name="Patient" >
018     <EntityField required="Hard" >
019       <FieldRef name="data://Demographic/Patient ID" />
020       <Usage type="query" />
021     </EntityField>
022   </Entity>
023 </QueryAbstraction>

The abstract query shown in Table I includes a selection specification (lines 005-012) containing selection criteria and a results specification (lines 013-016). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. The model entity "patient" is identified on line 017 and associates the model entity with the patient ID column of the demographic table (line 019).

Reducing a Size of a Data Set to be Processed by an Analytic Routine

In one embodiment, an analysis routine may be performed on a data set, e.g., to determine elements of the data set that are of interest to a user. The data set may include a result from executing a query against a database. Such a result typically provides a large dataset which includes many records for processing by the analysis routine. Further, the analysis routine may be invoked with parameters specified by the user (e.g., the selection of a particular routine to perform, or in the case of a docking routine, what receptor to evaluate for binding affinity for a group of chemical compounds). In one embodiment, the analysis routine may be modeled using a logical field in the data abstraction model. Additionally, the logical field representing such an analysis routine may store additional conditions used to filter the input set (i.e., the query result being input to the analysis routine).

In one embodiment, the query may be an abstract query against a database abstraction model for one or more relational databases. Further, the interface provided by the database abstraction model may allow the user to select a query (e.g., a query to retrieve a set of chemical compounds) and to select the analysis routine (e.g., by selecting a logical field provided by the database abstraction model) which is supplied the results of executing the query (i.e., the input data set). In such a case, the interface may prompt the user to supply one or more parameters for the selected analysis routine. Further, as noted, the logical field definition may also include a set of conditions used to evaluate records from the input data set prior to feeding each record to the analysis routine. Once the user selections are received, the runtime component may iterate over the input set and identify records to supply to the analysis routine (or conversely, records to exclude from the analysis routine). Further, the processes may overlap. That is, the processing done to prune the input data set (using the conditions from the logical field representing the analysis routine) may overlap with the actual performance of the analysis routine evaluating members of the input data set that survive the pruning.

Figure 3:
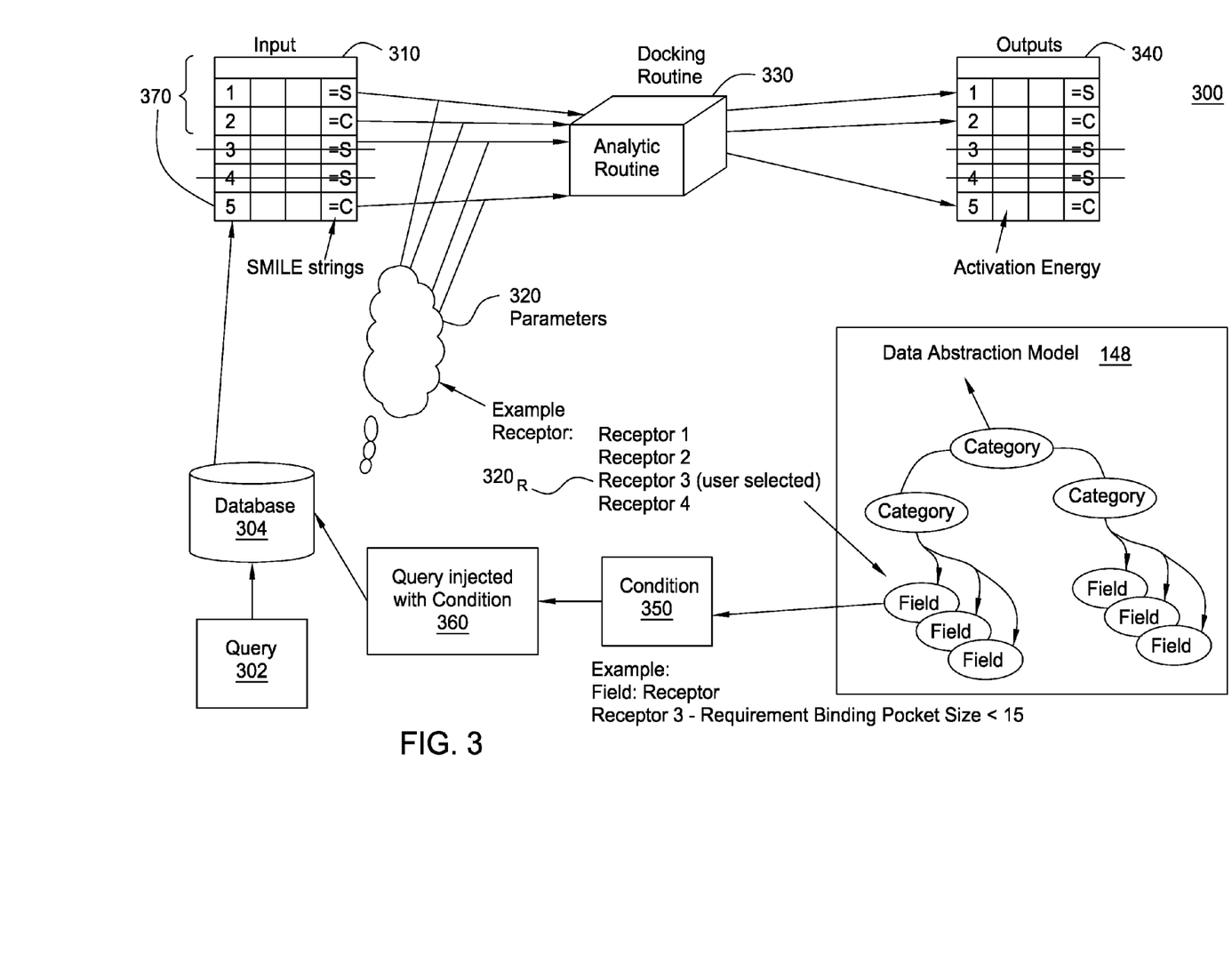
FIG. 3 is a data flow diagram that illustrates injecting parameter conditions to reduce a size of a data set to be processed, according to one embodiment of the invention.

FIG. 3 is a data flow diagram 300 that illustrates injecting parameter conditions to reduce a size of a data set to be processed, according to one embodiment of the invention. As shown, the data flow diagram 300 includes a data set 310, one or more parameters 320, an analytic routine 330, and a result set 340. Illustratively, the data set 310 provides a database query result (i.e., a table) with a set of database records to input to the analytic routine 330. As shown, the dataset 310 is generated using a query 302 against a database 304 (or against a database abstraction model for the database 304). The parameters 320 may be specific to a particular analytic routine 330 to be performed on the data set 310. The result set 340 may include outputs of performing a particular analytic routine 330 on the data set 310, based on the parameters 320.

For example, the analytic routine 330 may be a molecular docking routine. Molecular docking (or simply docking) predicts the preferred orientation of a first molecule to a second molecule, when the first and second molecules are bound to each other to form a stable complex. Knowledge of the preferred orientation may then be used to predict a strength of association or binding affinity between two molecules. The data set 310 may include chemical structures for which molecular docking is to be performed. Each chemical structure may be represented using a standard notation for representing chemicals, according to one embodiment. For example, the standard notation may be the simplified molecular input line entry specification (SMILES) notation. As is known, SMILES is a line notation for encoding molecular structures. In one embodiment, the analytic routine 330 may be performed on a computing cluster or massively parallel computing system. For example, the Blue Gene computer architecture IBM provides a massive parallel supercomputer, designed to reach operating speeds in the petaflop range. Similarly, implementations of the MapReduce or Hadoop software frameworks may be used to support distributed computing on large data sets on clusters of computers.

In this example, the parameters 320 include a user-selected receptor (e.g., selected via a GUI) against which a molecular docking analysis is to be performed. And the result set 340 includes an activation energy for each chemical structure of the data 310 determined by the analytic routine 330. Activation energy refers to energy that is to be overcome in order for a chemical reaction to occur. In this particular example, the activation energy for each chemical structure is the energy to be overcome for the respective chemical structure to bond with the user-selected receptor $320_R$. The activation energy for each chemical structure of the data set 310 may be determined from performing the molecular docking routine on the respective chemical structure. Often, however, the data set 110 may include so many individual entries so as to require large amounts of processing time, even on large clusters or massively parallel systems. For example, the data set 110 may include hundreds of thousands of SMILE formulas for which molecular docking is to be performed.

In one embodiment, the database abstraction model may include a logical field corresponding to the various parameters 320, such as the user-selected receptor. These logical fields contain one or more conditions associated with the respective parameter 320. For example, a particular receptor may require a binding pocket size of less than fifteen cubic angstroms. In this case, the data abstraction model 148 includes a logical field for this particular receptor, and the field specifies the relevant binding pocket size. During runtime, the condition injector may query the data abstraction model 148 using the user-selected receptor to retrieve conditions specific to respective parameters, such as the binding pocket size of the user-selected receptor.

Once a condition is identified (from the data abstraction model 148), the condition injector may modify the query 302 to include the identified condition 350 (namely, that each chemical structure of a data set is to have a binding pocket size of less than fifteen cubic angstroms). The condition injector may then execute the modified query 360 against the database 304 to generate a reduced data set 370. In one embodiment, the modified query 360 may be executed against a temporary table containing results from executing the query 302 (i.e., against the input data 310), As shown in FIG. 3, the reduced data set 370 includes only the first, second, and fifth chemical structures of the data set 310. That is, the condition injector identifies elements of the data set 310 that are unsuitable for the analytic routine 310, based on parameters 320 to the analytic routine 310. Such identified elements may be eliminated from the data set 310 for the analytic routine 310. Consequently, the analytic routine may be performed on the reduced data set 370 more quickly. Further, the condition injector may convey to the user which data elements were eliminated from the data set 310, In one embodiment, the data set 310 includes only preliminary results from executing the query 302 against the database 304 (e.g., when complete results for the query 302 may not be generated in a timely manner). In another embodiment, the database 304 may have been updated with new data after the query 302 is executed. In such cases, the reduced data set 370 obtained from executing a modified query 360 may also include data elements not originally found in the data set 310. In this case, the reduced data set 310 may also be regarded as an "expanded" data set, relative to the data set 310. That is, the reduced data 370 set may exclude data elements of the data set 310 while including data elements not found in the data set 310.

Figure 4:
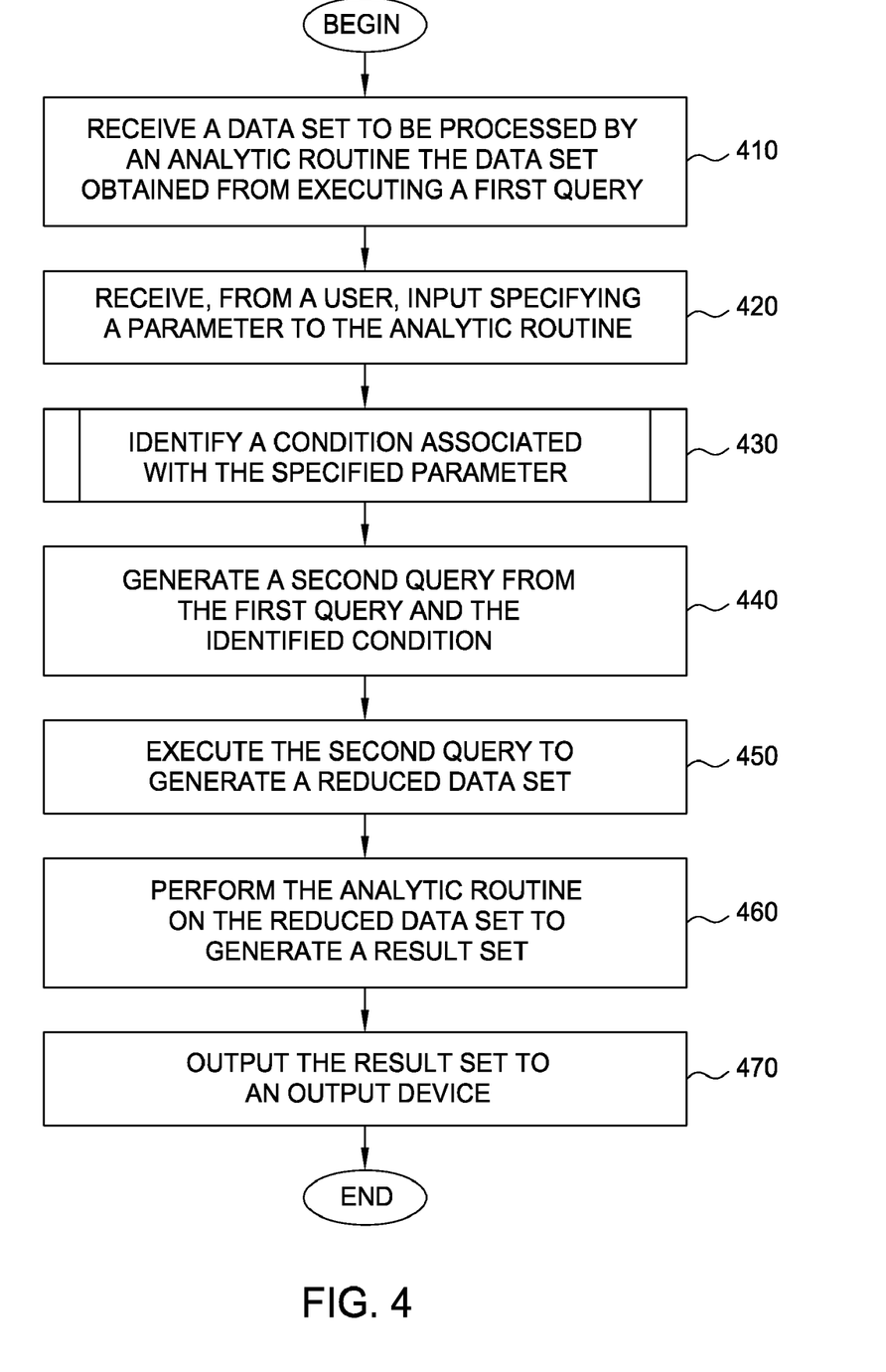
FIG. 4 is a flowchart depicting a method for injecting a parameter condition to reduce a size of a data set to be processed by an analytic routine, according to one embodiment of the invention.

FIG. 4 is a flowchart depicting a method 400 for injecting a parameter condition 350 to reduce a size of a data set to be processed by an analytic routine 330, according to one embodiment of the invention. As shown, the method 400 begins at step 410, where the condition injector receives a data set 310 to be processed by an analytic routine 330. The data set 310 may be obtained from executing a first query (e.g., the query 302). For example, a set of chemical structures may be received for which molecular docking is to be performed. At step 420, the condition injector may receive input specifying a parameter 320 to the analytic routine 330. For example, a user may select (e.g., from a GUI screen) a receptor against which to perform molecular docking. In one embodiment, the specified parameter may be modeled using a logical field in the data abstraction model. Additionally, the logical field representing such a parameter may store additional conditions used to filter the input set (i.e., the query result being input to the analysis routine for the specified parameter).

At step 430, the condition injector may identify one or more conditions 350 associated with the specified parameter 320. For example, a particular receptor may only bind with chemical structures having a binding pocket size of less than fifteen cubic angstroms. Identifying one or more conditions 350 is further described below in conjunction with FIG. 5. At step 440, the condition injector may generate a second query 360 from the first query 302 and the identified condition 350. For example, the identified condition 350 may be injected into the first query 302 to produce a modified query 360.

At step 450, the condition injector may execute the second query to generate a reduced data set 370. For example, the reduced data 370 set may exclude chemical structures of the received data set 310 that do not satisfy the identified condition. At step 460, the condition injector may perform the analytic routine 330 on the reduced data set 370 to generate a result set 340. For example, the result set 340 may include an activation energy for each chemical structure of the reduced data set 370. At step 470, the condition injector may output the result set 340 to an output device. After step 470, the method 400 terminates.

Figure 5:
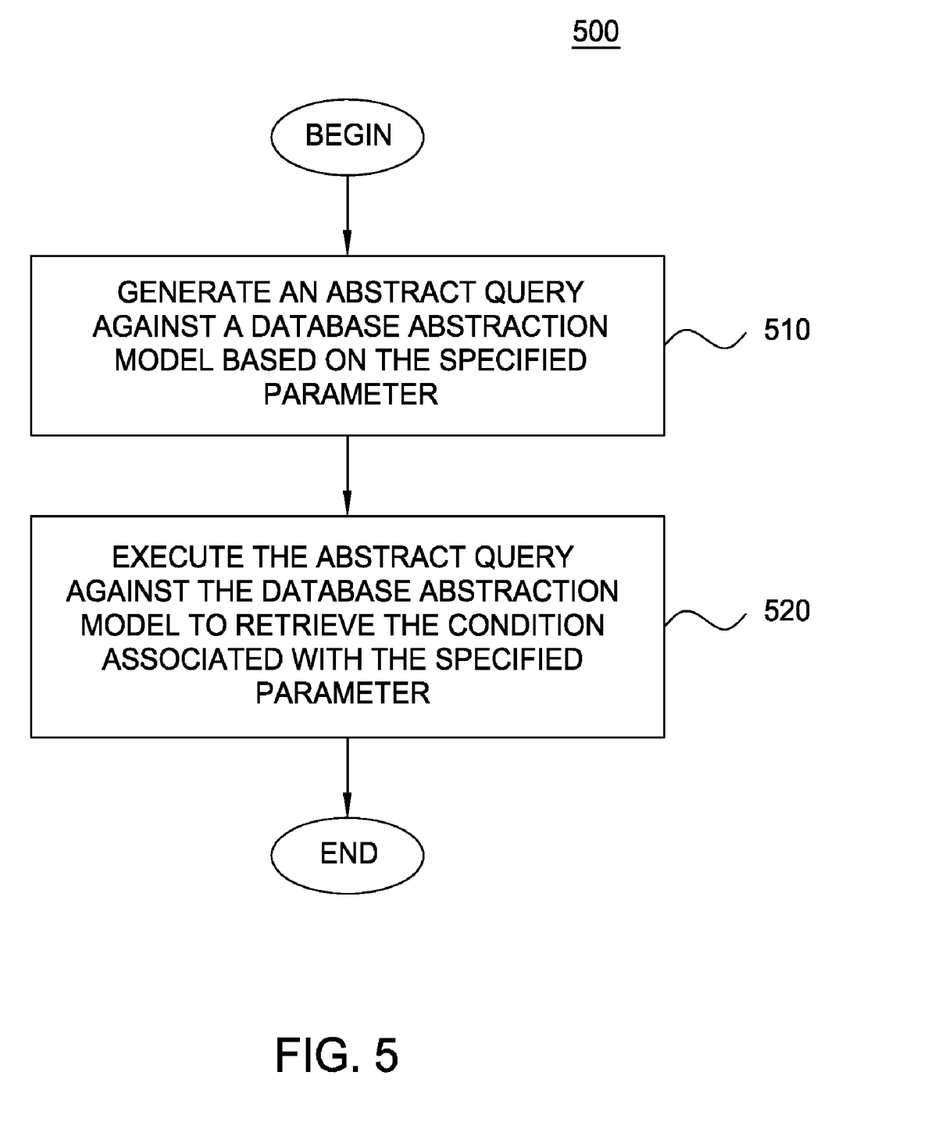
FIG. 5 is a flowchart depicting a method for identifying a condition associated with a specified parameter, according to one embodiment of the invention.

FIG. 5 is a flowchart depicting a method 500 for identifying a condition 350 associated with a specified parameter 320, according to one embodiment of the invention. The method 500 corresponds to the step 430 of FIG. 4. As shown, the method 500 begins at step 510, where the condition injector 150 generates an abstract query 202 against a database abstraction model 148 based on the specified parameter 320. For example, using the abstract query 202, the condition injector 150 may perform a lookup of the specified parameter 320 in the database abstraction model 148 to identify conditions associated with the specified parameter 320 (e.g., conditions included in a logical field definition for the specified parameter 320). At step 520, the condition injector 150 executes the abstract query 202 against the database abstraction model 148 to retrieve one or more conditions 350 associated with the specified parameter 320. After step 520, the method 500 terminates.

Figure 6:
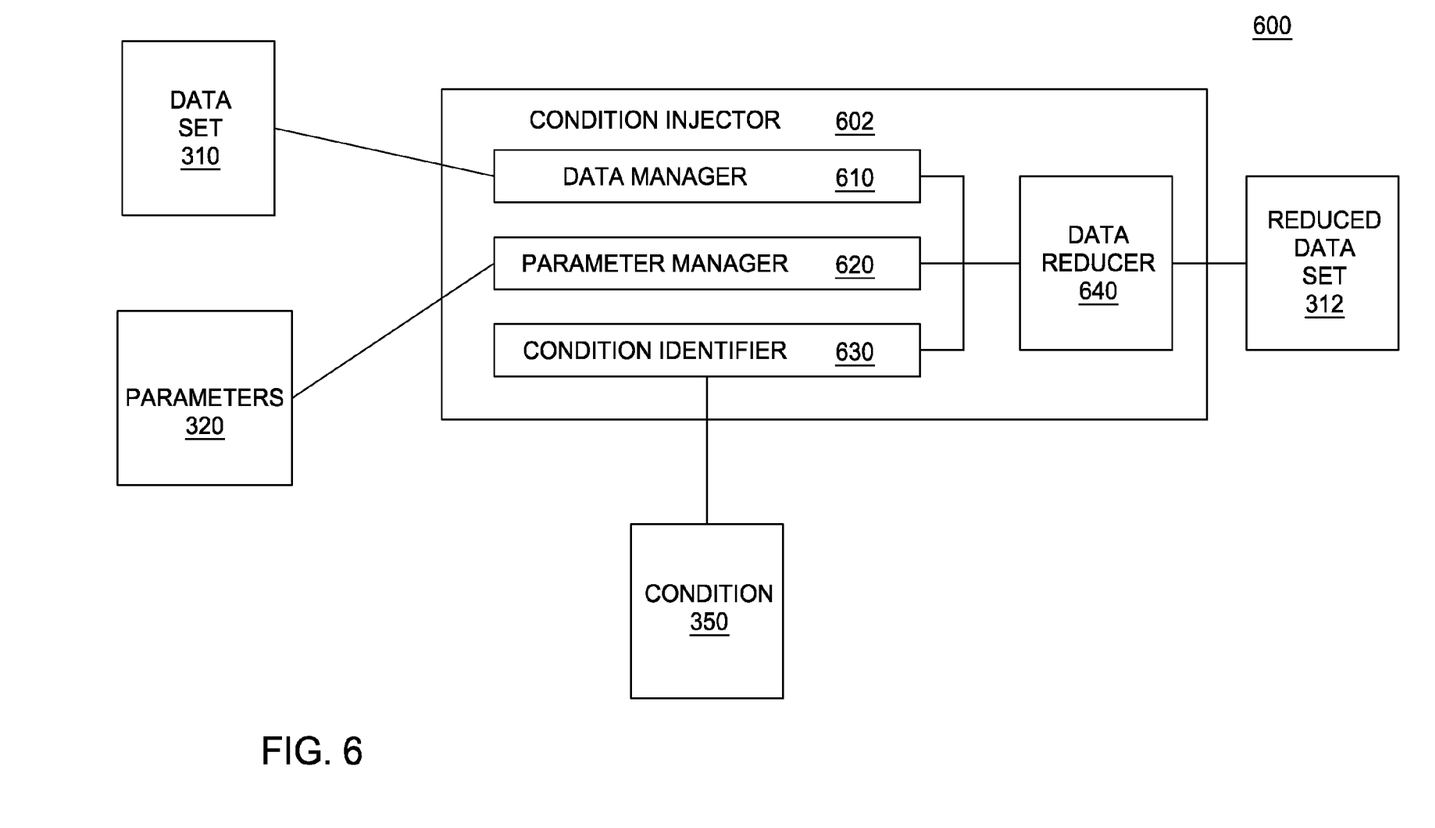
FIG. 6 is a block diagram illustrating components of a condition injector, according to one embodiment of the invention.

FIG. 6 is a block diagram illustrating components 600 of a condition injector 602, according to one embodiment of the invention. As shown, the condition injector 602 includes a data manager 610, a parameter manager 620, a condition identifier 630, and a data reducer 640.

In one embodiment, the data manager 610 receives the data set 310 for which the analytic routine 330 is to be performed. For example, a set of chemical structures may be received. The parameter manager 620 receives the user-specified parameter 320 to the analytic routine 330 that is to be performed, according to one embodiment. For example, a user may select a desired receptor against which molecular docking is to be performed. The condition identifier 630 determines the one or more conditions 350 associated with the specified parameter 320, according to one embodiment. For example, the selected receptor may only dock with chemical structures having a binding pocket size of less than fifteen cubic angstroms.

In one embodiment, the data reducer 640 generates a reduced data set 312 based on: (i) a query 302 from which the received data set 310 was generated and (ii) the identified condition 350. For example, the query 302 may be injected with the identified condition 350 to produce a modified query 360. The modified query 360 may then be executed against the database 304 to generate a reduced data set 370. The reduced data set 370 may exclude data elements (of the received data set 310) that do not satisfy the identified condition 350, according to one embodiment.

Of course, the embodiments described herein are intended to be illustrative and not limiting of the invention, and other embodiments are broadly contemplated. Those skilled in the art will recognize, for example, that embodiments of the invention may be adapted to support other queries, data sets, analytic routines, parameters, conditions, and result sets.

Advantageously, embodiments of the invention inject a parameter condition to reduce a size of a data set to be processed by an analytic routine. In one embodiment, a condition injector may receive a data set to be processed by the analytic routine. The data set may include results from executing a first query. Further, the condition injector may receive input specifying a parameter to the analytic routine. The condition injector may identify the parameter condition based on the specified parameter. The condition injector may also generate a second query from the first query and the identified condition. The second query may then be executed to retrieve a reduced data set. The analytic routine may be performed on the reduced data set to generate a result set, which may be output to an output device. To the extent that the reduced data set eliminates data elements in the received data set, the analytic routine may be performed on the reduced data set 370 in a timely manner.

While the foregoing is directed to embodiments of the present invention, other and further embodiments of the invention may be devised without departing from the basic scope thereof, and the scope thereof is determined by the claims that follow.

What is claimed is:

1. A computer-implemented method for reducing a size of a data set to be processed by an analytic routine, the method comprising:
    configuring one or more computer processors to perform an operation comprising:
        receiving a data set to be processed by the analytic routine, wherein the data set includes a set of data records returned from executing a first query;
        receiving, from a user, one or more parameters to pass with the data set to the to the analytic routine;
        identifying, from the one or more parameters, one or more conditions having predefined relationships to the respective parameters;
        evaluating each data record of the data set based on the one or more parameters and the one or more conditions to generate identify a reduced data set containing less than all of the set of data records;
        performing the analytic routine on the reduced data set to generate a result set; and
        outputting the result set, wherein evaluating each record of the data set includes
            generating a second query from the first query, the one or more parameters, and the identified condition; and
            executing the second query to generate the reduced data set.

2. The computer-implemented method of claim 1, wherein each record of the data set is evaluated to identify which records are to be excluded from the analytic routine.

3. The computer-implemented method of claim 1, wherein each record of the data set is evaluated to identify which records are to be included to the analytic routine.

4. The computer-implemented method of claim 1, wherein the analytic routine is a molecular docking routine configured to perform a docking analysis between a receptor specified by the parameter and each of a plurality of chemical structures, each of the plurality of chemical structures represented by a record of the data set, and wherein the output includes an activation energy for docking each chemical structure to the specified receptor.

5. The computer-implemented method of claim 1, wherein the operation further comprises:
    identifying at least one element of the data present in the received data set that is not present in the reduced data set; and
    conveying to the user identified elements excluded from processing by the analytic routine.

6. The computer-implemented method of claim 1, wherein both the first query and the second query are abstract queries composed from a plurality of logical fields of a database abstraction model, wherein each logical field identifies a name for the logical field and an access method that maps the logical field to a data source in a relational database, wherein each access method is selected from at least two different access method types, wherein each of the different access methods types defines a different manner of exposing, in the relational database, data corresponding to the name of the logical field, and wherein the database abstraction model comprises:
    the plurality of logical fields;
    a query building interface configured to allow the composition of an abstract query from the plurality of logical fields; and
    a runtime component configured to process an abstract query to generate a resolved query of the relational database from the abstract query.

7. The computer-implemented method of claim 1, wherein the second query is executed against the data set to exclude one or more records of the data set that fail to satisfy the identified conditions, and wherein the reduced data set comprises the data set less the excluded one or more records.

8. A computer readable non-transitory storage medium containing a program which, when executed, performs an operation for reducing a size of a data set to be processed by an analytic routine, the operation comprising:
    receiving a data set to be processed by the analytic routine, wherein the data set includes a set of data records returned from executing a first query;
    receiving, from a user, one or more parameters to pass with the data set to the to the analytic routine;
    identifying, from the one or more parameters, one or more conditions having predefined relationships to the respective parameters;
    evaluating each data record of the data set based on the one or more parameters and the one or more conditions to generate a reduced data set containing less than all of the set of data records;
    performing the analytic routine on the reduced data set to generate a result set; and
    outputting the result set.

9. The computer readable non-transitory storage medium of claim 8, wherein evaluating each record of the data set comprises:
    generating a second query from the first query, the one or more parameters, and the identified condition; and executing the second query to generate the reduced data set.

10. The computer readable non-transitory storage medium of claim 8, wherein each record of the data set is evaluated to identify which records are to be excluded from the analytic routine.

11. The computer readable non-transitory storage medium of claim 8, wherein each record of the data set is evaluated to identify which records are to be included to the analytic routine.

12. The computer readable non-transitory storage medium of claim 8, wherein the analytic routine is a molecular docking routine configured to perform a docking analysis between a receptor specified by the parameter and each of a plurality of chemical structures, each of the plurality of chemical structures represented by a record of the data set, and wherein the output includes an activation energy for docking each chemical structure to the specified receptor.

13. The computer readable non-transitory storage medium of claim 8, wherein the operation further comprises:
    identifying at least one element of the data present in the received data set that is not present in the reduced data set; and
    conveying to the user identified elements excluded from processing by the analytic routine.

14. The computer readable storage medium of claim 8, wherein both the first query and the second query are abstract queries composed from a plurality of logical fields of a database abstraction model, wherein each logical field identifies a name for the logical field and an access method that maps the logical field to a data source in a relational database, wherein each access method is selected from at least two different access method types, wherein each of the different access methods types defines a different manner of exposing, in the relational database, data corresponding to the name of the logical field, and wherein the database abstraction model comprises:
    the plurality of logical fields;
    a query building interface configured to allow the composition of an abstract query from the plurality of logical fields; and
    a runtime component configured to process an abstract query to generate a resolved query of the relational database from the abstract query.

15. The computer readable non-transitory storage medium of claim 8, wherein the second query is executed against the data set to exclude one or more records of the data set that fail to satisfy the identified conditions, and wherein the reduced data set comprises the data set less the excluded one or more records.

16. A system, comprising:
a processor; and
a memory containing a program, which when executed by the processor is configured to perform an operation for reducing a size of a data set to be processed by an analytic routine, the operation comprising:
    receiving a data set to be processed by the analytic routine, wherein the data set includes a set of data records returned from executing a first query,
    receiving, from a user, one or more parameters to pass with the data set to the to the analytic routine,
    identifying, from the one or more parameters, one or more conditions having predefined relationships to the respective parameters,
    evaluating each data record of the data set based on the one or more parameters and the one or more conditions to generate identify a reduced data set containing less than all of the set of data records,
    performing the analytic routine on the reduced data set to generate a result set, and
    outputting the result set, wherein evaluating each record of the data set includes,
    generating a second query from the first query, the one or more parameters, and the identified condition; and
    executing the second query to generate the reduced data set.

17. The system of claim 16, wherein each record of the data set is evaluated to identify which records are to be excluded from the analytic routine.

18. The system of claim 16, wherein each record of the data set is evaluated to identify which records are to be included to the analytic routine.

19. The system of claim 16, wherein the analytic routine is a molecular docking routine configured to perform a docking analysis between a receptor specified by the parameter and each of a plurality of chemical structures, each of the plurality of chemical structures represented by a record of the data set, and wherein the output includes an activation energy for docking each chemical structure to the specified receptor.

20. The system of claim 16, wherein the operation further comprises:
    identifying at least one element of the data present in the received data set that is not present in the reduced data set; and
    conveying to the user identified elements excluded from processing by the analytic routine.

21. The system of claim 16, wherein both the first query and the second query are abstract queries composed from a plurality of logical fields of a database abstraction model, wherein each logical field identifies a name for the logical field and an access method that maps the logical field to a data source in a relational database, wherein each access method is selected from at least two different access method types, wherein each of the different access methods types defines a different manner of exposing, in the relational database, data corresponding to the name of the logical field, and wherein the database abstraction model comprises:
    the plurality of logical fields;
    a query building interface configured to allow the composition of an abstract query from the plurality of logical fields; and
    a runtime component configured to process an abstract query to generate a resolved query of the relational database from the abstract query.

22. The system of claim 16, wherein the second query is executed against the data set to exclude one or more records of the data set that fail to satisfy the identified conditions, and wherein the reduced data set comprises the data set less the excluded one or more records.

* * * * *